(12) United States Patent
Loladia et al.

(10) Patent No.: US 12,095,725 B2
(45) Date of Patent: Sep. 17, 2024

(54) DEVICE CREDENTIALS MANAGEMENT

(71) Applicant: Amazon Technologies, Inc., Seattle, WA (US)

(72) Inventors: Rameez Loladia, Seattle, WA (US); Ashutosh Thakur, Bellevue, WA (US); William Alexander Stevenson, Seattle, WA (US); Ramkishore Bhattacharyya, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 110 days.

(21) Appl. No.: 15/466,659

(22) Filed: Mar. 22, 2017

(65) Prior Publication Data

US 2018/0278607 A1 Sep. 27, 2018

(51) Int. Cl.
*G06F 7/04* (2006.01)
*H04L 9/40* (2022.01)
*H04L 41/0893* (2022.01)
*H04L 61/4588* (2022.01)
*H04L 67/303* (2022.01)
(Continued)

(52) U.S. Cl.
CPC ...... *H04L 61/4588* (2022.05); *H04L 41/0893* (2013.01); *H04L 63/0823* (2013.01); *H04L 63/0876* (2013.01); *H04L 67/303* (2013.01); *H04W 4/70* (2018.02); *H04W 12/068* (2021.01); *H04W 12/069* (2021.01)

(58) Field of Classification Search
CPC ........ G06F 21/33; G06F 21/44; G06F 9/5005; G06F 21/30; G06F 21/31; G06F 21/60; G06F 21/62; G06F 21/335; H04L 9/0866; H04L 63/0861; H04L 63/0876; H04L 63/10; H04L 61/1588; H04L 41/0893; H04L 63/0823; H04L 67/303; H04W 12/06; H04W 12/37; H04W 4/70; H04W 12/068; H04W 12/069
USPC .......................................................... 726/1
See application file for complete search history.

(56) References Cited

U.S. PATENT DOCUMENTS 8,850,049 B1 * 9/2014 Qureshi .............. H04L 12/2876
709/224
9,071,967 B1 * 6/2015 Davies ................ H04W 12/069
(Continued)

OTHER PUBLICATIONS

Ranchal et al., Privacy Preserving Access Control in Service Oriented Architecture, Jul. 2, 2016, IEEE, pp. 412-419. (Year: 2016).*
(Continued)

*Primary Examiner* — Philip J Chea
*Assistant Examiner* — Jenise E Jackson
(74) *Attorney, Agent, or Firm* — Davis Wright Tremaine LLP

(57) ABSTRACT

A technology is described for resolving device credentials for a device. An example method may include receiving device credentials for management by a service provider. The device credentials may include authentication credentials and a device policy document that specifies permissions used to authorize resource actions requested by the device. In response to receiving a message requesting that a resource perform a resource action associated with the device, the device may be authenticated using the authentication credentials, and the resource action may be authorized using the permissions specified in the device policy document.

20 Claims, 10 Drawing Sheets

(51) Int. Cl.
- *H04W 4/70* (2018.01)
- *H04W 12/06* (2021.01)
- *H04W 12/069* (2021.01)

(56) References Cited

U.S. PATENT DOCUMENTS

| | | | | |
|---|---|---|---|---|
| 9,444,892 | B1* | 9/2016 | Amireddy | H04L 51/18 |
| 9,510,388 | B1* | 11/2016 | Gegout | H04W 48/14 |
| 9,602,625 | B2* | 3/2017 | Russell | H04L 67/564 |
| 2005/0081044 | A1* | 4/2005 | Giles | H04L 63/08 713/182 |
| 2006/0224742 | A1* | 10/2006 | Shahbazi | H04L 63/20 709/226 |
| 2006/0230437 | A1* | 10/2006 | Alexander Boyer | H04L 9/0836 726/4 |
| 2007/0143824 | A1* | 6/2007 | Shahbazi | H04L 63/083 726/1 |
| 2008/0194296 | A1* | 8/2008 | Roundtree | G06F 21/62 455/558 |
| 2009/0328219 | A1* | 12/2009 | Narayanaswamy | H04L 63/1408 709/239 |
| 2010/0005516 | A1* | 1/2010 | Alberti | G06F 21/6218 726/6 |
| 2012/0303831 | A1* | 11/2012 | Toshniwal | H04L 65/1069 709/229 |
| 2013/0115915 | A1* | 5/2013 | Tipton | H04L 63/20 455/411 |
| 2013/0227659 | A1* | 8/2013 | Raleigh | G06Q 30/0283 726/5 |
| 2013/0239177 | A1* | 9/2013 | Sigurdson | H04L 63/102 726/4 |
| 2013/0305330 | A1* | 11/2013 | Palanigounder | H04W 12/04 726/6 |
| 2014/0165155 | A1* | 6/2014 | Zhang | H04L 41/28 726/4 |
| 2014/0165165 | A1* | 6/2014 | Story, Jr. | H04L 63/08 726/6 |
| 2014/0298403 | A1* | 10/2014 | Qureshi | G06F 21/41 726/1 |
| 2014/0310387 | A1* | 10/2014 | Kamal | H04L 43/08 709/221 |
| 2015/0046989 | A1* | 2/2015 | Oberheide | H04L 63/0876 726/6 |
| 2015/0199506 | A1* | 7/2015 | Gouda | G06F 21/31 726/1 |
| 2016/0072839 | A1* | 3/2016 | Mortimore, Jr. | H04L 63/20 726/1 |
| 2016/0105463 | A1* | 4/2016 | Stuntebeck | H04L 51/04 726/1 |
| 2016/0119348 | A1* | 4/2016 | Kus | H04L 63/10 726/1 |
| 2016/0139573 | A1* | 5/2016 | Soni | G05B 15/02 |
| 2016/0149901 | A1* | 5/2016 | Liu | H04W 12/50 726/5 |
| 2016/0269442 | A1* | 9/2016 | Shieh | H04L 63/1433 |
| 2016/0285690 | A1* | 9/2016 | Hardy | H04L 63/20 |
| 2016/0286396 | A1* | 9/2016 | Tuukkanen | H04W 12/069 |
| 2016/0294828 | A1 | 10/2016 | Zakaria | |
| 2016/0373430 | A1* | 12/2016 | Bhat | H04L 63/0838 |
| 2017/0064666 | A1* | 3/2017 | Zhang | H04W 64/00 |
| 2017/0104687 | A1* | 4/2017 | Peterson | H04L 47/70 |
| 2017/0124342 | A1* | 5/2017 | Panchapakesan | G06F 21/10 |
| 2017/0188232 | A1* | 6/2017 | Raleigh | H04W 12/06 |
| 2017/0199796 | A1* | 7/2017 | Chaput | H04L 67/12 |
| 2017/0250807 | A1* | 8/2017 | Brannon | H04L 63/0823 |
| 2017/0257363 | A1* | 9/2017 | Franke | H04W 12/069 |
| 2018/0004585 | A1* | 1/2018 | Aguilar Mares | G06F 9/45558 |
| 2018/0097798 | A1* | 4/2018 | Yin | G06F 21/577 |
| 2018/0176017 | A1* | 6/2018 | Rodriguez | H04L 63/20 |
| 2018/0255158 | A1* | 9/2018 | Bradley | H04L 67/34 |
| 2018/0293389 | A1* | 10/2018 | Mahaffey | H04L 63/0227 |
| 2019/0018801 | A1* | 1/2019 | Linga | G06F 16/93 |
| 2019/0028865 | A1* | 1/2019 | Raleigh | H04W 4/50 |
| 2019/0057219 | A1* | 2/2019 | Panchapakesan | G06F 21/6209 |

OTHER PUBLICATIONS

Sabbari et al, Improving Attribute Based Access Control Model for Web Services, Dec. 14, 2011, IEEE, pp. 1223-1228. (Year: 2011).*
Anonymous, AWS IoT Developer Guide, retrieved from the internet May 25, 2018, URL: https://web.archive.org/web/20161213115313i%20f%20_/http://docs.aws.amazon.com:80/iot/latest/developerguide/iot-dg.pdf, Dec. 13, 2016, 84 pages.
Dominique Guinard et al, Web of things application architecture, integrating the real-world into the Web, A dissertation submitted to ETH Zurich, Jan. 1, 2011, 248 pages, Switzerland.
Vollbrecht et al, AAA Authorization Framework; The Internet Society, Aug. 2000, 31 pages, United States of America.
Chinese First Office Action for Patent Application No. 201880013311.8 dated Aug. 30, 2021, 17 pages.
Amazon, "AWS IoT: Developer Guide," Amazon Web Services 2016, 261 pages.
European 94(3) Communication for Patent Application No. 18712039.9 dated Feb. 16, 2021, 5 pages.
Gunnar et al., "On Using Policies for Managing Service Provisioning in Agent-Based Heterogenous Environments for Mobile Users," Proceedings of the Sixth IEEE International Workshop on Policies for Distributed Systems and Networks (Policy '05), 10 pages.
Chinese Second Office Action for Patent Application No. 201880013311.8 dated Jul. 4, 2022, 7 pages.
European 71(3) Communication Intention to Grant for Patent Application No. 18712039.9 dated Oct. 5, 2023, 51 pages.
European Decision to Grant Patent Application No. 18712039.9 dated Nov. 16, 2023, 2 pages.
European 71(3) Communication Intention to Grant for Patent Application No. 18712039.9 dated Apr. 21, 2023, 51 pages.

* cited by examiner

DEVICE CREDENTIALS MANAGEMENT

BACKGROUND

Electronic devices have become ever-present in many aspects of society. During the course of a normal day, a person may use a smart phone, a tablet device, and a laptop computer. Automobiles and commercial vehicles have also come to rely upon electronic systems to control and monitor many features and operations. Modern home appliances such as, washers, dryers, and refrigerators may be driven and controlled by electronic systems. Manufacturing facilities, building heating and cooling systems (HVAC), and farming equipment may now rely upon electronic sensors and control systems.

Advancements in communication technologies have allowed for even relatively simple electronic devices to communicate with other devices and computing systems over a computer network. For example, an electronic device in a manufacturing system may monitor various aspects of the manufacturing process and communicate monitoring data to other devices in the manufacturing system. Similarly, electronic sensors embedded in a building control system may monitor and communicate details regarding operation of the building's heating, cooling, and ventilation systems. Even home appliances offer the possibility of being configured with communication capabilities for the purpose of transmitting status and receiving external control communications.

DETAILED DESCRIPTION

Figure 1:
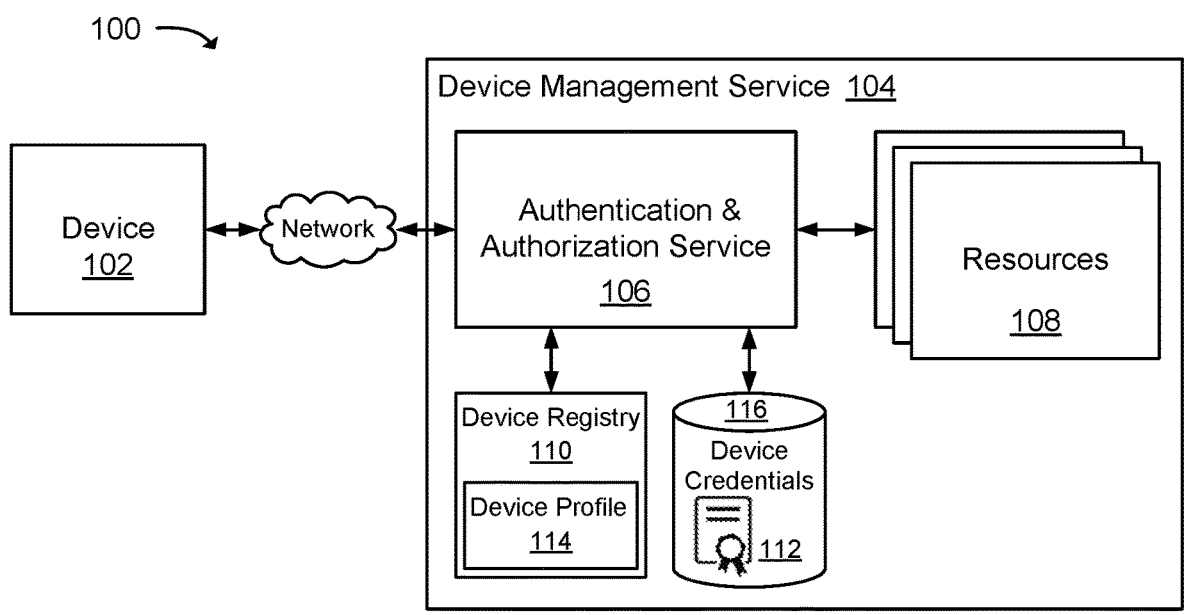
FIG. 1 is a block diagram illustrating an example system for authenticating a device using device credentials.

A technology is described for managing credentials for devices. A device may be one of many physical devices that create a large network of addressable devices. This entire "network" is commonly referred to as the Internet of Things (IoT). The devices making up the network may be addressable over a computer network and/or eventually addressable (e.g., capable of receiving relayed messages sent over a computer network). The devices may be configured to connect to resources, such as services, applications, and/or other devices over a computer network using a security management model in which the identity of a device is independent from credentials for the device. For example, a device identifier (e.g., a unique identifier assigned to a device) for a device may be managed separately from device credentials (e.g., a certificate, token, username-password, signature, device policies, etc.) for the device. Under the security management model, a device customer may define an explicit mutable or changable association between a device identifier and device credentials, as well as define many-to-many relationships between device identifiers and device credentials.

In one example, customers may register devices with a device management service that provides a service platform for devices to connect to service provider resources, such as applications, virtualized services and resources, and other devices. The device management service may be able to support billions of devices and trillions of messages that can be processed and routed to service endpoints and devices. The device management service may provide authentication and authorization at points of connection with a service provider environment. As part of registering devices with the device management service, a customer can create and manage a device profile using a device management console or API (Application Program Interface). The device profile may act as a device identity that includes a device serial number, device identifier, and/or device metadata. A device registry may be used to manage device profiles. Also, the customer may create and manage device credentials using the device management console or API. A security service may be used to manage the device credential. The customer may associate the device credentials (e.g., a signed certificate and a device policy) with the device, as well as with other devices, allowing the device credentials to be shared among a plurality of devices.

Device policies may specify permissions for accessing resources available to a customer's devices through the device management service. A customer may control individual device access to resources by granting and revoking permissions to the resources via device policies for the resources. The device permissions specified by a device policy may be managed at a device identity level or at device credentials level. Also, some specifications of a device policy may be substituted using substitution variables (e.g., device attributes), allowing the device policy to be applied to multiple devices. For example, a generic device policy that includes dynamic parameters (e.g., device name, device location, device capability, etc.) may be implemented for a class of devices and the dynamic parameters may be populated using device attributes (e.g., device name, device location, device capability, etc.) for a device in response to a connection request from the device.

As a non-limiting example, as part of a connection request from a device to a resource, the device may be authenticated using a signed certificate provided by the device. After authenticating the device, the connection request may be authorized by identifying a device policy for the connection request, identifying a device profile for the device, and populating a dynamic parameter in the device policy with metadata obtained from the device profile.

To further describe the present technology, examples are now provided with reference to the figures. FIG. 1 is a high level diagram illustrating an example of a system 100 used for authenticating a device 102. The system 100 may include a device management service 104 used to provide a platform for connecting devices 102 to resources 108 (e.g., managed services) and other devices 102, as well as enable applications to interact with the devices 102. The device management service 104 may include an authentication and authorization service 106, a device registry 110, a credentials data store 116, and other components.

In one example, the authentication and authorization service 106 may be configured to authenticate a device 102 associated with a request to connect to a resource 108, application, or another device. The authentication and authorization service 106 may be configured to support various methods of authentication, including signature, certificate, token, username-password, and other authentication methods. A method of authentication used may be based on a connection protocol used by a device 102. For example, devices 102 that connect to the device management service 104 using HTTP (Hypertext Transport Protocol) can use signature or certificate authentication, while device connections using MQTT (MQ Telemetry Transport) may use certificate based authentication, and device connections using WebSockets may use signature authentication. Accordingly, the authentication and authorization service 106 may be configured to use an authentication method that uses a connection protocol used by a device 102.

As illustrated, device credentials 112 used to authenticate and authorize a device action, such as connecting to a resource or requesting a resource action, may be managed separately from a device profile 114 for the device 102, thereby decoupling device credentials 112 from the identity of the device 102. In the past, device security for devices connecting to a device management service 104 included a tight coupling between an identity of a device and security credentials that provide the device with access to resources 108, applications, or other devices. Due to the tight coupling between a device identity and security credentials, each device may have been assigned its own security credentials that are stored on the device itself. As a result of the present technology, device credentials 112 may be managed separately from a device profile 114, decoupling the device credentials 112 from the device identity, and permitting the device credentials 112 to be associated with more than just one device 102.

In one example, the device registry 110 may be used to manage a device profile 114. The device profile 114 may include identifying information that includes, but is not limited to a device serial number, device identifier, and device metadata. Illustratively, the device identifier may be used to uniquely identify a device 102, manage device permissions, track device transactions, etc. As part of registering a device 102 with the device management service 104, a device customer may create a device profile 114 for a device 102 and assign a device identifier 114 to the device 102. Thereafter, the customer may manage device information for the device 102 via the device profile 114.

Also, as part of registering the device 102 with the device management service 104, device credentials 112 may be created for the device 102, or a customer may provide existing device credentials 112, and the device credentials 112 may be managed separately from a device profile 114 in the credentials data store 116. The device credentials 112 may allow devices 102 to securely connect to the device management service 104 and access resources 108, applications, and/or other devices through the device management service 104. In one example, a customer may associate device credentials 112 with a device identity by linking the device credentials 112 to a device profile 114. That is, the device credentials 112 may be linked to a device identifier or device metadata included in the device profile 114.

After registering the device 102 with the device management service 104, the device 102 may send messages to the device management service 104 requesting a resource 108 to perform resource actions. Illustratively, resource actions may include, but are not limited to: updating a state of a device representation to a state of the device 102, updating a record in a data store, retrieving data from a data store, requesting that a message broker subscribe the device 102 to a named logical channel (e.g., topic), as well as other resource actions. Also, clients (e.g., applications) acting on the device's behalf may send messages to the device management service 104 requesting that a resource action be performed.

A message received at the device management service 104 may include an authentication credential, such as a signed certificate, token, or similar type of device credential. The message may be provided to the authentication and authorization service 106, which may be configured to authenticate the device 102 using the provided credential, and authorize the requested resource action using a device policy.

As an illustration, the authentication and authorization service 106 may be configured to obtain a device profile 114 for the device 102 from the device registry 110 and retrieve device credentials 112 (e.g., a public key and a device policy) linked to the device profile 114 from the credentials data store 116. More specifically, the device credentials 112 may be linked to information included in the device profile 114, such as a device identifier or a device attribute. Having retrieved the device credentials 112, the device 102 may be authenticated using the device credentials 112.

After authenticating the device 102, a determination may be made whether a resource action specified in the message may be performed. A determination whether to allow the resource action may be made using device permissions for the device 102 specified in a device policy, as described in greater detail below.

Figure 2:
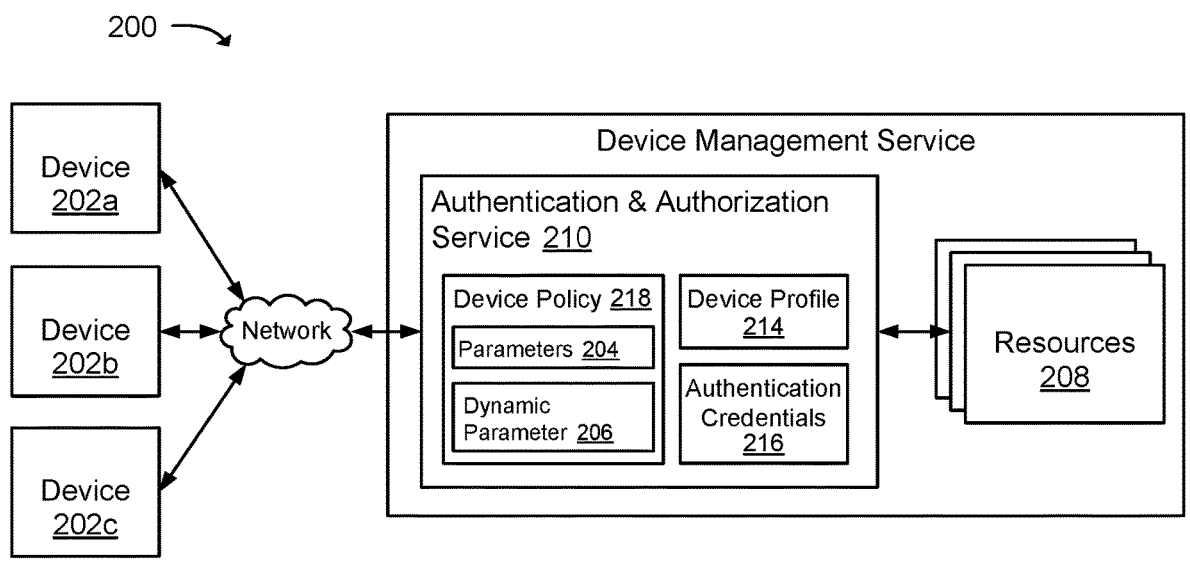
FIG. 2 is a block diagram that illustrates an example system for authenticating devices and authorizing resource actions using device policies.

FIG. 2 is a high-level diagram illustrating an example of a system 200 for authenticating devices 202a-c using authentication credentials 216, such as a device certificate, and authorizing device actions using a device policy 218. A device policy 218 may be used to assign permissions to a device 202a-c, or more specifically, associate permissions with a device profile 214 and/or device credentials. The permissions may allow a device 202a-c to access a resource 208 and request that the resource 208 perform an action. As a specific example, a device policy 218 may include permissions that allow a device 202a-c (or a client acting on behalf of the device 202a-c) to request that a device shadowing service update a state (e.g., "on" or "off") of a device representation (used to represent the state of the device 202a-c) to the current state of the device 202a-c. In one example, a device policy 218 may comprise a document (e.g., a data-interchange format document, such as a JSON (JavaScript Object Notation) document or XML (eXtensible Markup Language) document) that specifies device permissions.

In one example, a device policy 218 may include parameters that specify resources 208, resource actions, permissions for accessing the resources and performing the resource actions, and conditions for granting the permissions. As an illustration, a device policy 218 implemented using a JSON document may resemble:

```
{"Version": "2017-01-25",
    "Statement": [{
        "Effect": "Allow",
        "Action": ["Publish_Topic"],
        "Resource": ["resource:iot:1575:topic/foo/bar"]},
    "Condition": {
        "Bool": {"iot:device_name.IsAttached":["true"]}]
}
```

In the example illustrated, the device policy 218 may include static parameters 204 (e.g., resources and resource actions) and dynamic parameters 206 (e.g., conditions for accessing resources and resource actions). Dynamic parameters 206 included in a device policy 218 may be populated using information obtained from a device profile 214. For example, a dynamic parameter 206 for a condition that a request be made by a particular device 202*a-c* may be populated with a device name or device identifier obtained from a device profile 214. The dynamic parameter 206 may be populated at the time that device authorization for the device 202*a-c* is performed. As a more specific example, at the time of authentication of a first device 202*a*, a dynamic parameter 206 for a condition of a device policy 218 may be populated using a device name for the device 202*a*, which may be obtained from a device profile 214 for the device. In the case that the condition is fulfilled using the device name, a resource action specified by the device policy 218 may be performed.

In one example, a dynamic parameter 206 may be populated using a group attribute associated with a group of devices. The group attribute may be used to determine permissions for the group of devices. As an illustration, a group of network addressable lighting devices located together in a room may be associated with a group device profile 214 that includes device metadata shared among the lighting devices. In response to a request from one of the lighting devices, the group device profile 214 may be identified and a group attribute included in the group device profile 214 may be used to populate a dynamic parameter 206 in a device policy 218 used to authorize a resource action requested by the lighting device.

In the past, device customers have had to create a policy for each of the customer's devices and link each of the customer's devices to an individual policy. As a result of the present technology, device customers may be able to create a single device policy 218 (e.g., a device agnostic policy) that includes one or more dynamic parameters 206 and link the device policy 218 to multiple devices 202*a-c*. As will be appreciated, a determination of which parameters are made static or dynamic may be based on a specific implementation of the present technology.

A device policy 218 may be attached, for example, to a device profile 214 and/or device credentials (e.g., authentication credentials 216). In doing so, device permissions may be managed at either a device level or a credentials level. As one example, a device policy 218 may be linked to one or more device profiles 214 via device identifiers, such that when messages are received from devices 202*a-c* associated with the device identifiers, the device policy 218 linked to the device identifiers may be referenced to determine whether the devices 202*a-c* have been assigned permissions that allow the devices 202*a-c* to access a resource and request a resource action. For example, in response to receiving a message associated with a device 202*a-c*, the authentication and authorization service 210 may be configured to retrieve a device policy 218 linked to the device 202*a-c* via a device profile 214. For example, the device profile 214 may specify that the device policy 218 is linked to the device 202*a-c*.

As another example, a device policy 218 may be linked to one or more device profiles 214 via device metadata included in the device profiles 214, such that the device policy 218 may be applied to communications from devices 202*a-c* associated with the device metadata. As an illustration, a device policy 218 may be applied to communications from devices 202*a-c* located in a particular region, building, or room using device metadata included in device profiles 214 for the devices 202*a-c*. As an example, a device policy 218 may include a condition that the device policy 218 applies to devices 202*a-c* located in a particular building. That is, the device policy 218 may specify a particular building name. Consequently, the device policy 218 may be applied to those devices 202*a-c* having device profiles 214 that indicate that the devices 202*a-c* are located in building having the building name. Namely, the device profiles 214 may include location metadata that matches the building name. As such, a device 202*a-c* may be disassociated with a device policy 218 by changing information in a device profile 214 that links the device 202*a-c* to the device policy 218.

As another example, a device policy 218 may be linked to other device credential, such as authentication credentials 216, allowing the device policy 218 to be shared by devices 202*a-c* that use the authentication credentials 216. A device policy 218 linked to authentication credentials 216 shared among a number of devices 202*a-c* may include permissions that may be applied to the devices 202*a-c* when authenticating and authorizing the devices 202*a-c*.

Figure 3:
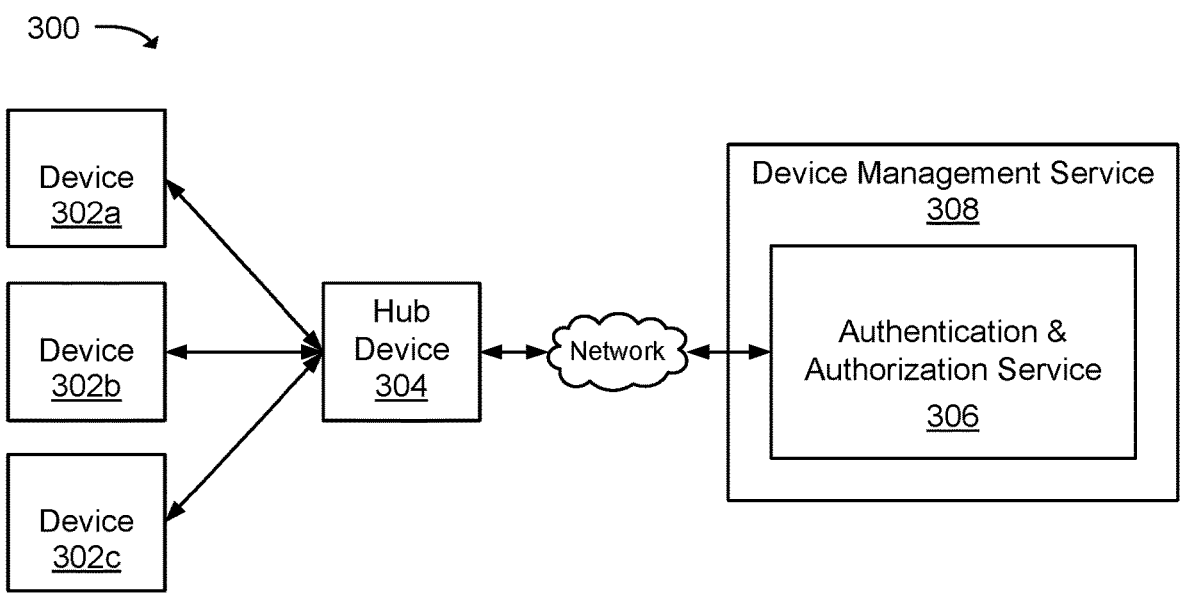
FIG. 3 is a block diagram illustrating an example system for resolving device credentials for devices that communicate with a device management service through a hub device.

FIG. 3 is a block diagram illustrating an example system 300 for resolving device credentials for devices 302*a-c* that communicate with a device management service 308 through a hub device 304. The hub device 304 may be configured to forward messages associated with the devices 30*a-c* to the device management service 308 and to the device 302*a-c*. Messages forwarded by the hub device 304 to the device management service 308 may be provided to an authentication and authorization service 306 configured to resolve device credentials associated with a device 302*a-c* that sent the message and authenticate the device 302*a-c* and authorize an action using the device credentials.

The hub device 304 may communicate with the device management service 308 on behalf of many devices 302*a-c*, and each connection established by the hub device 304 on behalf of a device 302*a-c* may be authenticated and authorized using device credentials linked to the device 302*a-c*. For example, a message forwarded by the hub device 304 to the device management service 308 may include identifying information for a device 302*a-c* that sent the message. The identifying information included in the message may be used to identify device credentials that may be used to authenticate the device 302*a-c* and authorize a resource action requested in the message, as described earlier. In addition to authenticating the device 302*a-c*, in one example, the hub device 304 may also be authenticated using device credentials assigned to the hub device 304.

In one example, each device 302*a-c* that connects to the device management service 308 via a hub device 304 may be associated with device credentials assigned to the device 302*a-c* as described in association with FIG. 2. For example, messages received from the hub device 304 for a first device 302*a* may be authenticated and authorized using device credentials assigned to the first device 302*a*, and messages received from the hub device 304 for a second device 302*b* may be authenticated and authorized using device credentials assigned to the second device 302b.

In another example, device credentials may be shared among devices 302a-c that connect to the device management service 308 through a hub device 304. In addition, the devices 302a-c may be assigned different permissions using a device policy that includes one or more dynamic parameters. For example, device permissions specified in the device policy may be based on an identity of a device 302a-c. Therefore, in determining device permissions for a device 302a-c, a dynamic parameter in the device policy may be populated with a device identifier for the device 302a-c.

Figure 4:
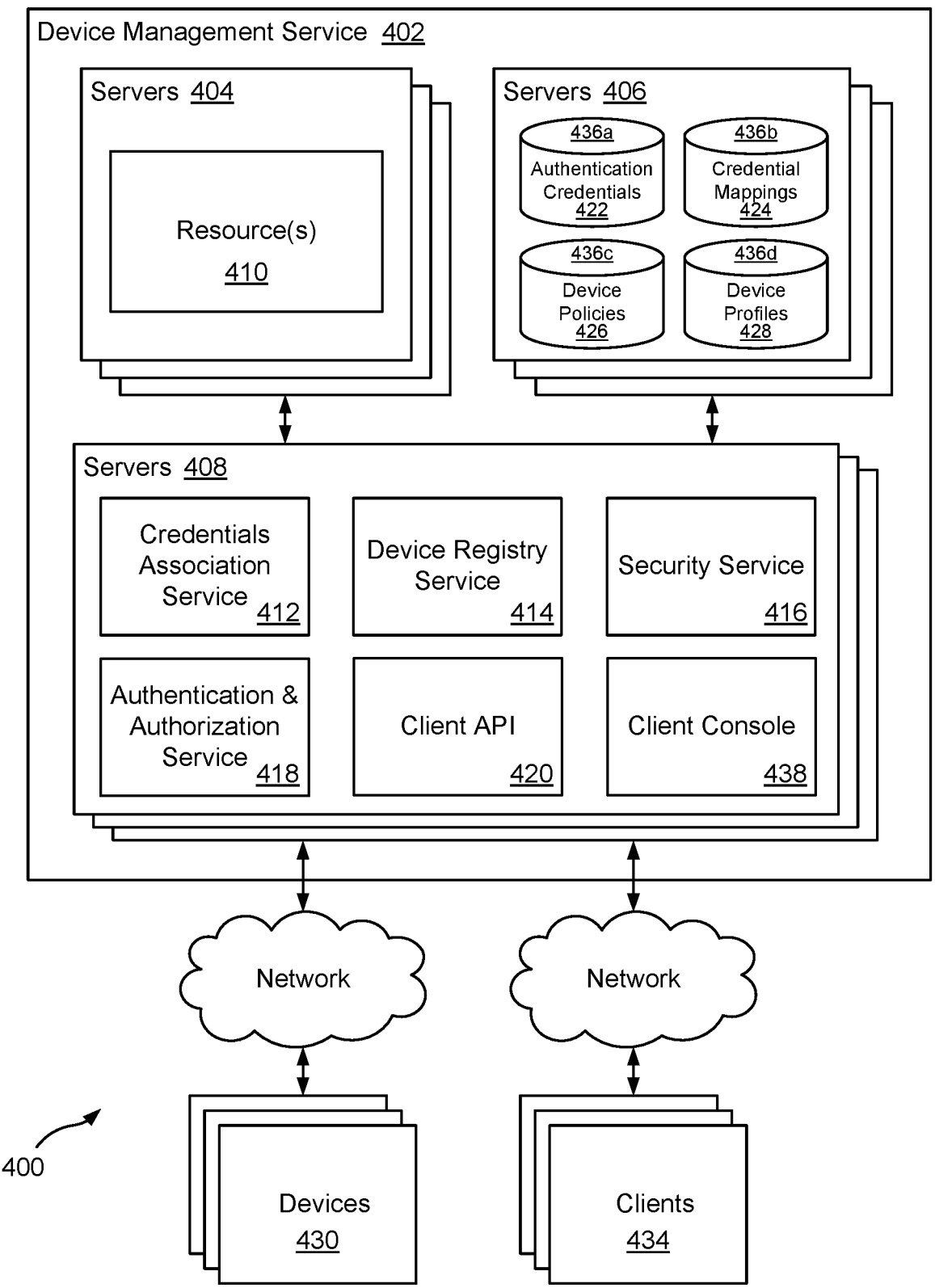
FIG. 4 is a block diagram that illustrates various example components included in a system for authenticating a device and authorizing a device action.

FIG. 4 illustrates components of an example system environment 400 on which the present technology may be executed. The system environment 400 may include devices 430 that may be in communication with a device management service 402 by way of one or more networks. The device management service 402 may be configured to provide a service platform for the devices 430 to connect to various resources 410 made accessible to the devices 430. The devices 430 (which may be commonly referred to as IoT devices) may send messages to the device management service 402 requesting access to the resources 410 and requesting the execution of resource actions.

In one example, the resources 410 provided to the devices 430 via the device management service 402 may include: a message broker service, device shadowing service, computing services, data services, applications, and other resources 410. A message broker service may be configured to maintain a list of devices 430 registered to communicate with the device management service 402 and forward messages published to a named logical channel (e.g., topic) to the devices 430 registered to receive messages published to the named logical channel. The device shadowing service may be configured to manage device representations which represent last known states of devices 430. For example, the device shadowing service may maintain a cached device representation for a device 430 that allows clients 434 to access information, such as state information, for the device 430 at any time.

Clients 434 (e.g., mobile applications) may also be in network communication with the device management service 402. The clients 434 may host applications configured for accessing information associated with the devices 430 and controlling the devices 430 via the resources 410 provided by the device management service 402. The device management service may be configured to support connections from a client 434 using the authentication and authorization service 418 and a client identifier. In one example, the client identifier may be used to retrieve credentials that provide the client 434 with limited access to a resource 410.

The device management service 402 may include a number of servers 404/406/408 configured to host resources 410, authentication related services, and data services. In some examples, the servers 404/406/408 may be configured to host virtualized computing resources, such as computing instances on which the resources 410, authentication services, and data services may execute. As illustrated, the servers 408 may host a client API 420, a security service 416, a device registry service 414, a credentials association service 412, and an authentication and authorization service 418.

In one example, the client API 420 may be configured to allow a customer, via a client 434, to access the device registry service 414, the security service 416, and the credentials association service 412 in order to manage device profiles 428, device policies 426, and authentication credentials 422 (e.g., certificates, tokens, username-passwords, signatures, and other types of credentials) associated with the customer's devices 430. For example, a customer may access the device registry service 414 and create and manage a device profile 428 for a device 430. The device profile 428 may include a device identifier, device metadata (e.g., device name, type, model, location, etc.), and device properties.

A customer may access the security service 416 to manage authentication credentials 422 and device policies 426. In one example, a service provider may create authentication credentials 422 for the customer's devices 430. For example, certificates generated by a service provider can be used for the customer's devices 430. In another example, a customer can provide the customer's own credentials. For example, a customer may provide certificates signed by the customer's preferred Certificate Authority (CA). In one example, authentication credentials 422 may be associated with a specific resource 410. Therefore, authentication credentials 422 may be created for a customer's devices 430 that allow the devices 430 to connect to the resource 410.

The security service 416 may allow a customer to create and manage device policies 426 used to authorize device requests to access resources 410 and perform resource actions. As described earlier, a device policy 426 may include one or more dynamic parameters that allow the device policy 426 to be shared across the customer's devices 430. In one example, a customer may associate/disassociate a device policy 426 with the customer's devices 430 by linking/unlinking the device policy 426 to information included in device profiles 428, such as device identifiers or device metadata.

A customer may access the credentials association service 412 to create and manage credentials mappings 424 that map device profiles 428 to device policies 426 and/or authentication credentials 422. In one example, using the client API 420 to access the credentials association service 412, a customer may create and manage a credentials mapping 424 that links one or more device policies 426 to device profiles 428 (e.g., via a device identifier) and/or authentication credentials 422. A customer may use the client API 420 to update and delete existing credentials mappings 424, enabling the customer to update/rotate device policies 426 and authentication credentials 422 and revoke device policies 426 and authentication credentials 422.

The authentication and authorization service 418 may be configured to perform authentication of a device 430 requesting access to a resource 410 and determine whether the device 430 has been assigned permissions that allow access to the resource 410. In one example, authentication of a device 430 may be performed by identifying authentication credentials 422 (e.g., using public keys) linked to authentication credentials provided by a device 430 (e.g., a signed certificate and private key). After authenticating the device 430, the device registry service 414 may be queried for a device profile 428 for the device 430. Device information included in the device profile 428, such as a device identifier or device attribute, may be submitted to the credentials association service 412, which may be configured to use the device information to identify a credentials mapping 424 that maps the device information to a device policy 426. The credentials association service 412 may return device policy information to the authentication and authorization service 418, whereupon the authentication and authorization service 418 may query the security service for the device policy 426 associated with the resource 410. After obtaining the device policy 426, a determination may be made whether the device 430 has been assigned permissions that allow the device 430 to access the resource. In one example, the authentication and authorization service 418 may be configured to populate dynamic parameters included in the device policy 426 with device attributes obtained from the device profile 428.

The various processes and/or other functionality contained within the system environment 400 may be executed on one or more processors that are in communication with one or more memory modules. The system environment 400 may include a number of computing devices that are arranged, for example, in one or more server banks or computer banks or other arrangements. The computing devices may support a computing environment using hypervisors, virtual machine monitors (VMMs) and other virtualization software. In one example, the device management service 402 may be hosted in a service provider environment. For example, the device management service 402 may be hosted by the service provider environment described in association with FIG. 6. The computing devices may be located in a service provider data center and/or a customer data center located on customer premises.

Servers 406 may host data stores 436a-d used to store authentication credentials 422, credentials mappings 424, device policies 426, and device profiles 428. Authentication credentials 422 may include: certificates, tokens, username-passwords, signatures, and other types of credentials. Device policies 426 may include documents containing permissions for accessing resources 410 and performing the resource actions, and conditions for granting the permissions. Device profiles 428 may include documents containing device information, such as a device identifier and device metadata. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

A customer may create, deploy, and manage authentication credentials 422, device profiles 428, and device policies 426 for the customer's devices using a client console 438 or using the client API 420. API calls, procedure calls, or other network commands that may be made in relation to modules and services included in the device management service 402 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

A network used to transmit communications to the devices 430, clients 434, and servers 404/406/408 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 4 illustrates that certain processing may be performed using computing services. In one example configuration, a service with one or more processes may execute on a server or other computer hardware. Such services may be centrally hosted functionality or a service application that may receive requests and provide output to other services or consumer devices. For example, services may be considered on-demand computing that are hosted in a server, virtualized service environment, grid or cluster computing system. An API may be provided for each service to enable a second service to send requests to and receive output from the first service. Such APIs may also allow third parties to interface with the service and make requests and receive output from the services. While FIG. 4 illustrates an example of a system that may implement the techniques above, many other similar or different environments are possible. The example environments discussed and illustrated above are merely representative and not limiting.

Figure 5:
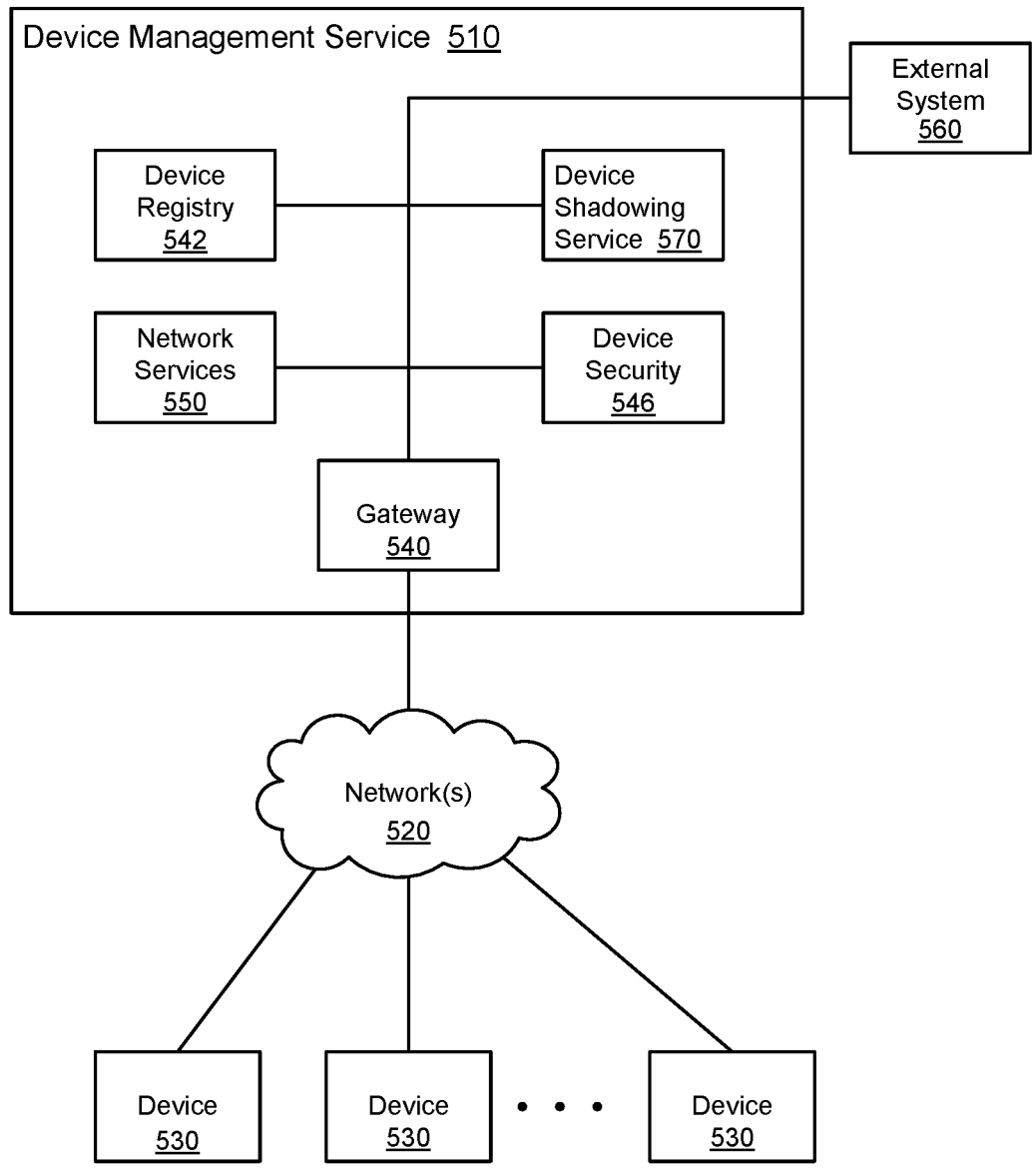
FIG. 5 is a block diagram illustrating an example computer networking architecture for providing devices access to network services.

FIG. 5 is a block diagram illustrating additional components that may be included in an example device management service 510 with which the devices 530 described earlier may communicate. The device management service 510, which may also be referred to as a device communication environment may comprise various resources made accessible via a gateway server 540 to the devices 530 that access the gateway server 540 via a network 520. The devices 530 may access the device management service 510 in order to access services such as a device shadowing service 570, data storage, and computing processing features. Services operating in the device management service 510 may communicate data and messages to the devices 530 in response to requests from the devices 530 and/or in response to computing operations within the services.

The device management service 510 may comprise communicatively coupled component systems 540, 542, 546, 550 and 570 that operate to provide services to the devices 530. The gateway server 540 may be configured to provide an interface between the devices 530 and the device management service 510. The gateway server 540 receives requests from the devices 530 and forwards corresponding data and messages to the appropriate systems within the device management service 510. Likewise, when systems within the device management service 510 attempt to communicate data instructions to the devices 530, the gateway server 540 routes those requests to the correct device 530.

The gateway server 540 may be adapted to communicate with varied devices 530 using various different computing and communication capabilities. For example, the gateway server 540 may be adapted to communicate using either TCP (Transmission Control Protocol) or UDP (User Datagram Protocol) protocols. Likewise, the gateway server 540 may be programmed to receive and communicate with the devices 530 using any suitable protocol including, for example, MQTT, CoAP, HTTP, and HTTPS. The gateway server 540 may be programmed to convert the data and instructions or messages received from the devices 530 into a format that may be used by other server systems comprised in the device management service 510. In one example, the gateway server 540 may be adapted to convert a message received using the HTTPS protocol into a JSON formatted message that is suitable for communication to other servers within the device management service 510.

The gateway server 540 may store, or may control the storing, of information regarding the devices 530 that have formed a connection to the particular gateway server 540 and for which the particular gateway server 540 may be generally relied upon for communications with the device 530. In one example, the gateway server 540 may have stored thereon information specifying the particular device 530 such as a device identifier. For each connection established from the particular device 530, the gateway server 540 may also maintain information identifying the connection. For example, a connection identifier may be generated and stored for each connection established with a particular device 530. Information relating to the particular connection may also be stored. For example, information identifying the particular socket of the gateway server 540 on which the connection was established, as well as information identifying the particular protocol used by the device 530 on the connection may be stored by the gateway server 540. Information such as the socket and protocol may be used in order to facilitate further communications via the particular connection.

In one example, the gateway server 540 may communicate via any suitable networking technology with a device registry server 542. The device registry server 542 may be adapted to track the attributes and capabilities of each device 530. In an example, the device registry sever 542 may be provisioned with information specifying the attributes of the devices 530. The device registry server 542 may comprise data specifying rules or logic (e.g., automation rules) for handling various requests that may be received from the devices 530. The device registry server 542 may be programmed to convert specialized device functions or commands received in particular communication protocols such as, for example HTTPS, MQTT, CoAP, into functions or commands using particular protocols that are understood by other of the servers in the device management service 510. In one example, the device registry server 542 may be provisioned with information specifying that upon receipt of a particular request from a particular device 530, a request should be made to store the payload data of the request in a particular network services server 550. The device registry server 542 may be similarly programmed to receive requests from servers 542, 550 and convert those requests into commands and protocols understood by the devices 530.

The device shadowing service server 570 maintains state information for each connected device 530. In an example embodiment, the device shadowing service server 570 maintains for each device 530 that has connected to the device management service 510 information specifying a plurality of states. In an example scenario, the device shadowing service server 570 may comprise a recorded state and a desired state. The recorded state represents the existing state of the particular device 530 as presently known to the device shadowing service server 570. The device shadowing service server 570 communicates with the gateway server 540 in order to communicate requests to update a status to a particular device 530. For example, the device shadowing sever 570 may communicate to the gateway server 540 a sequence of state transition commands that update the status of a device 530. The gateway server 540 may, in response, communicate the appropriate commands formatted for the particular device.

The device security server 546 maintains security-related information for the devices 530 that connect to the device management service 510. The device security server 546 may perform the functions of the authentication and authorization service described earlier. In one example, the device security server 546 may be programmed to process requests to register devices 530 with the device management service 510. For example, entities such as device manufacturers, may forward requests to register devices 530 with the device management service 510. The device security server 546 receives registration requests and assigns unique device identifiers to devices 530 which use the device identifiers on subsequent requests to access the device management service 510. The device security server 546 stores, for each registered device, authentication information that may be provided during the device registration process. For example, a request to register a device 530 may comprise information identifying the device 530 such as a device serial number and device attributes, which may be managed separately from authentication information used to authenticate the device 530. In one example, authentication information may comprise a digital certificate and may comprise a public key of a public key-private key pair. The authentication information may be stored in relation to a device 530, multiple devices 530, a resource, or multiple resources. When the device 530 subsequently attempts to access the device management service 510, the request may be routed to the device security server 546 for evaluation. The device security server 546 determines whether authentication information stored in relation to the device 530, or a resource requested by the device 530, is valid.

The device security server 546 may be further programmed to process requests to associate particular entities (individuals or organizations) with particular devices 530. The device security server 546 may be adapted to receive requests to register entities, which may be, for example, individuals, users, accounts, and/or organizations, as authorized to control or communicate with a particular device 530. In one example, a request may be received from an individual or organization that may have purchased a device 530 from a manufacturer. For example, the device 530 may be a dishwasher, thermostat, or lighting assembly that an individual or organization purchased from the manufacturer. The individual or organization may initiate a request to register the device 530 with the individual or an organization with which the organization is associated. The request may be routed to a web services server which may be comprised in device management service 510 or which communicates the request to the device management service 510. The request identifies the device 530 and the particular entity (individual or organization) that is requesting to be associated with the device 530. In one example, the request may comprise a unique device identifier that was assigned when the device 530 was registered with the system. The request further may comprise information uniquely identifying the entity that is registering as having authority to communicate with and/or control the particular device 530.

The device security server 546 stores the information identifying the particular entity in relation with the device identifier. When the particular entity subsequently attempts to control or communicate data to the particular device 530, the device security server 546 may use the information to confirm that the particular entity is authorized to communicate with or control the particular device 530. When an entity that has not been registered as being authorized to communicate with the device 530 attempts to communicate with or control the device 530, the device security server 546 may use the information stored in the device security server 546 to deny the request.

A network services server 550 may be any resource or processing server that may be used by any of servers 540, 542, 546, or 570 in processing requests from the devices 530. In one example, network services server 550 may provide data storage and retrieval services and/or on-demand processing capacity. In an example scenario, the network services server 550 may be any of numerous network accessible services including, for example, web or cloud-based services. In one example, the network services server 550 may be programmed to provide particular processing for particular devices 530 and/or groups of devices 530. For example, a network services server 550 may be provisioned with software that coordinates the operation of a particular set of devices 530 that control a particular manufacturing operation.

Servers 540, 542, 546, 550, and 570 may be communicatively coupled via any suitable networking hardware and software. For example, the servers may communicate via a local area network or wide area network.

An external system 560 may access device management service 510 for any number of purposes. In one example, an external system 560 may be a system adapted to forward requests to register devices 530 with the device management service 510. For example, an external system 560 may include a server operated by or for a device manufacturer that sends requests to device management service 510, and device security server 546 in particular, to register devices 530 for operation with device management service 510. Similarly, the external system 560 may be a system operated to provide a gateway for entities (individuals or organizations) to register an ownership or control relationship with a particular device 530.

The devices 530 may be any devices that may be communicatively coupled via a network 520 with the device management service 510. For example, the devices 530 may be computing devices such as smart phones and tablet computers, automobiles, appliances such as washers and driers, industrial sensors, switches, control systems, etc. In one example, each of devices 530 may communicate over the network 520 to store data reflecting the operations of the particular device 530 and/or to request processing provided by, for example, network services server 550. While FIG. 5 depicts three devices 530, it will be appreciated that any number of devices 530 may access the device management service 510 via the gateway server 540. Further it will be appreciated that the devices 530 may employ various different communication protocols. For example, some devices 530 may transport data using TCP, while others may communicate data using UDP. Some devices 530 may use MQTT, while others may use CoAP, and still others may use HTTPs. It will also be appreciated that each of devices 530 may be programmed to send and receive particular functions or commands in its requests that are not compatible with other devices or even the systems within device management service 510. The gateway server 540 may be programmed to receive and, if needed, attend to converting such requests for processing with the device management service 510.

Figure 6:
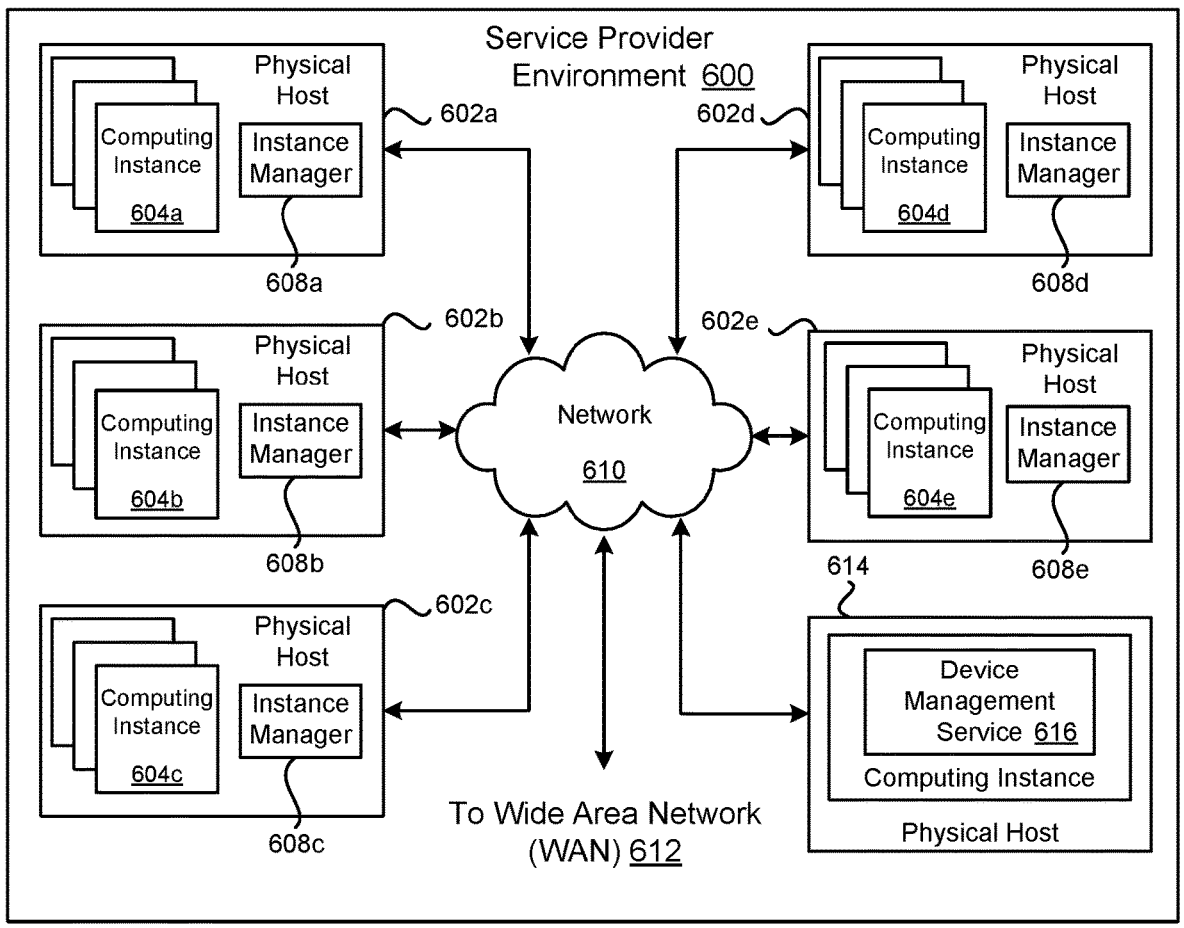
FIG. 6 is a block diagram that illustrates an example computing service environment that includes an authentication and authorization service.

FIG. 6 is a block diagram illustrating an example service provider environment 600 that may be used to execute and manage a number of computing instances 604a-e. In particular, the service provider environment 600 depicted illustrates one environment in which the technology described herein may be used. The service provider environment 600 may be one type of environment that includes various virtualized service resources that may be used, for instance, to host computing instances 604a-e.

The service provider environment 600 may be capable of delivery of computing, storage and networking capacity as a software service to a community of end recipients. In one example, the service provider environment 600 may be established for an organization by or on behalf of the organization. That is, the service provider environment 600 may offer a "private cloud environment." In another example, the service provider environment 600 may support a multi-tenant environment, wherein a plurality of customers may operate independently (i.e., a public cloud environment). Generally speaking, the service provider environment 600 may provide the following models: Infrastructure as a Service ("IaaS"), Platform as a Service ("PaaS"), and/or Software as a Service ("SaaS"). Other models may be provided. For the IaaS model, the service provider environment 600 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on a computing service platform provided by the service provider environment 600 without incurring the cost of buying and managing the underlying hardware and software. The SaaS model allows installation and operation of application software in the service provider environment 600. End customers may access the service provider environment 600 using networked client devices, such as desktop computers, laptops, tablets, smartphones, etc. running web browsers or other lightweight client applications, for example. Those familiar with the art will recognize that the service provider environment 600 may be described as a "cloud" environment.

The particularly illustrated service provider environment 600 may include a plurality of physical hosts 602a-e. While six physical hosts are shown, any number may be used, and large data centers may include thousands of physical hosts. The service provider environment 600 may provide computing resources for executing computing instances 604a-e. Computing instances 604a-e may, for example, be virtual machines. A virtual machine may be an instance of a software implementation of a machine (i.e. a computer) that executes applications like a physical machine. In the example of a virtual machine, each of the physical hosts 602a-e may be configured to execute an instance manager 608a-e capable of executing the instances. The instance manager 608a-e may be a hypervisor, virtual machine monitor (VMM), or another type of program configured to enable the execution of multiple computing instances 604a-e on a single physical host. Additionally, each of the computing instances 604a-e may be configured to execute one or more applications.

A physical host 614 may execute the device management service 616 described earlier. In one example, the device management service 616 may be hosted by one or more computing instances 604a-e. A network 610 may be utilized to interconnect the service provider environment 600 and the physical hosts 602a-e, 614. The network 610 may be a local area network (LAN) and may be connected to a Wide Area Network (WAN) 612 or the Internet, so that end customers may access the service provider environment 600. The network topology illustrated in FIG. 6 has been simplified, many more networks and networking devices may be utilized to interconnect the various computing systems disclosed herein.

Figure 7:
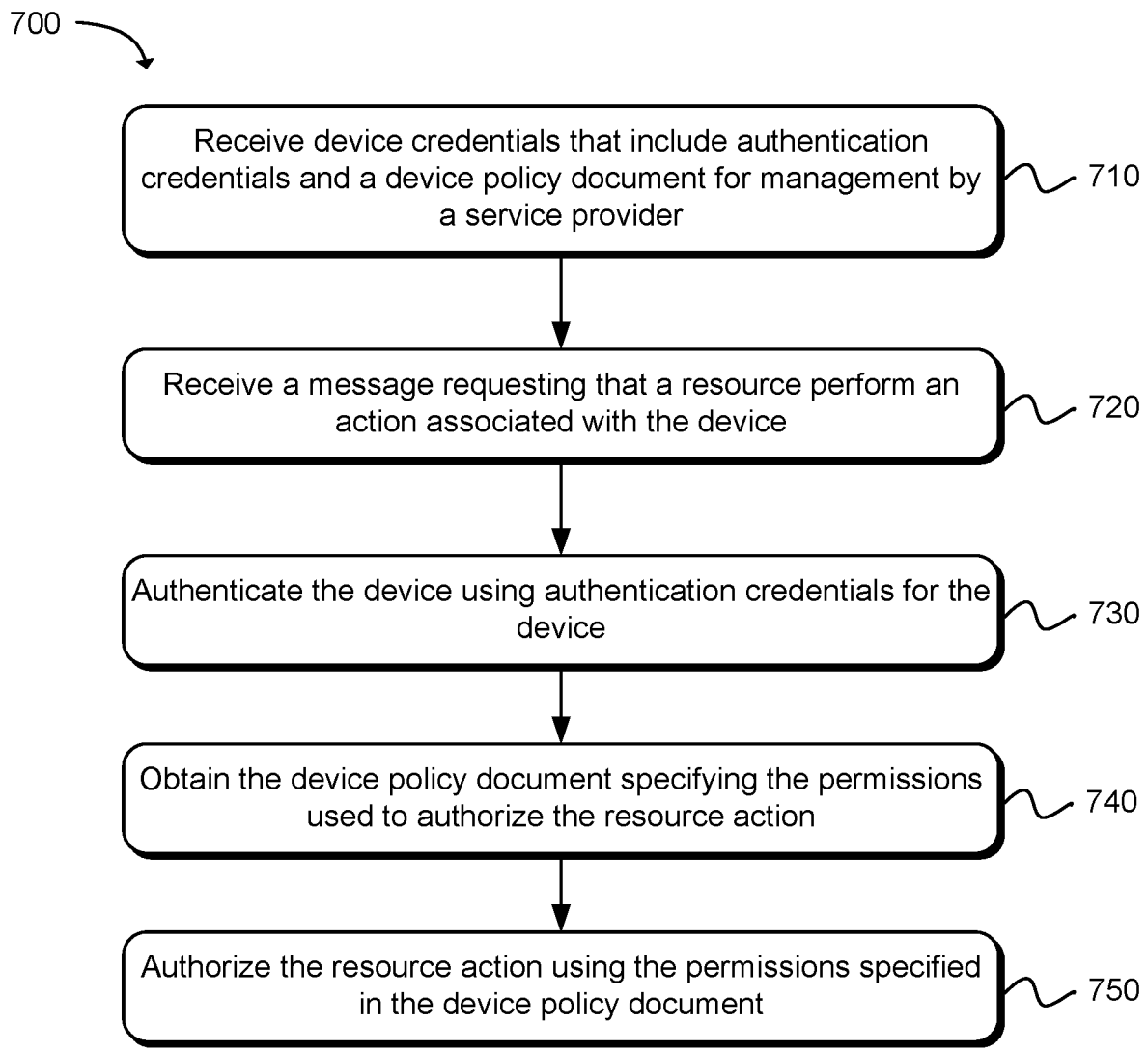
FIG. 7 is a flow diagram illustrating an example method for resolving device credentials for a device.

Moving now to FIG. 7, a flow diagram illustrates an example method 700 for resolving device credentials for a device. As described earlier, device credentials may be managed separately from an identity of a device, thereby allowing the device credentials to be associated with a plurality of devices. As in block 710, device credentials may be received for management by a service provider, where the device credentials may be for a device configured to communicate with a service provider resource. The device credentials may include authentication credentials used to authenticate the identity of the device and a device policy document specifying permissions for accessing resources and requesting resource actions. In one example, a customer may provide the device credentials to a device management service that provides a service platform for devices to connect to service provider resources. The customer may associate the device credentials with a device profile, allowing authentication of communications received from the device to be performed using the device credentials.

In receiving the device credentials, the device credentials may be associated with identifying information for the device. For example, a customer may create a device profile that includes a device identifier and device metadata for the device. As part of providing the device credentials for management by the service provider, the customer may link the device credentials to the identity of the device via the device profile. For example, the customer may link the device credentials to the device identifier, and/or the device credentials may be linked to an attribute of the device via device metadata. In one example, the device credentials may be linked to a plurality of device identifiers, allowing the device credentials to be shared by a plurality of devices associated with the device identifiers.

By managing the device credentials separately from an identity of the device, the customer may have the ability to revoke the device credentials from the device without destroying the identity of the device. For example, the customer may disassociate a device identifier for the device from the device credentials, thereby revoking the device credentials from the device and leaving the device identifier intact. In the past, a device identity (e.g., a unique identifier and metadata describing a device and the purpose of the device) has been intertwined with device credentials. As a result, revoking the device credentials may have destroyed the device identity, and provisioning new device credentials may have resulted in having to recreate the device identity.

As in block 720, a message requesting an action associated with the device may be received. The message may be received from the device or from an application hosted on a client device configured to obtain device information from a device management service and/or control the device via the device management service. In one example, the message may include the authentication credentials and information for the device that may be used to identify a device profile for the device.

As in block 730, the device may be authenticated using the authentication credentials. In one example, authentication may be performed by an authentication service that acts as a gateway to resources provided by a device management service. In another example, the authentication credentials may be provided to a resource to which a device requested access to and the resource may perform device authentication using the authentication credentials. For example, some resources, such as managed services, may expect to receive authentication credentials along with a request to access the resource and perform a resource action. In such cases, in response to a message requesting that a resource action be performed, an authentication service may provide authentication credentials for a device along with the request to the resource specified in the message, and the resource may authenticate the device using the device credential.

After authenticating the identity of the device, as in block 740, the device policy document specifying the permissions used to authorize the resource action may be obtained. The device policy document may be linked to the identity of the device (via the device profile), or the device policy document may be linked to the authentication credentials. As in block 750, the resource action may be authorized using the permissions specified in the device policy document. In one example, one or more dynamic parameters in the device policy document may be populated using device metadata as described earlier. After the resource action has been authorized, the resource action may be executed by a respective resource.

Figure 8:
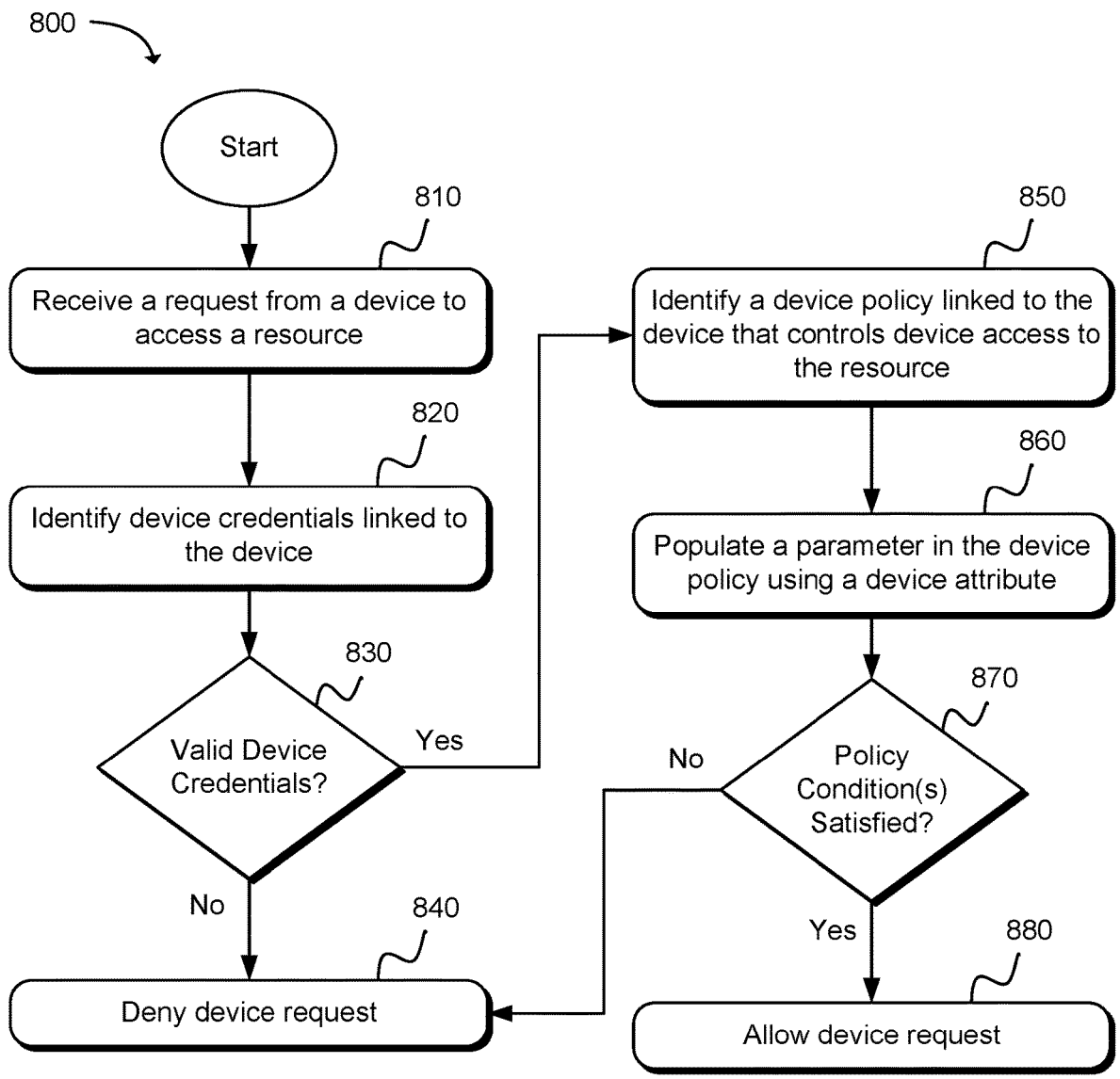
FIG. 8 is a flow diagram that illustrates an example method for determining device access to a resource.

FIG. 8 is a flow diagram illustrating an example method 800 for determining device access to a resource. In one example, devices may be in network communication with a device management service. The devices may be provided with access to resources through the device management service. The resources may include, but are not limited to, a message broker service, device shadowing service, computing services, data services, applications, and other devices.

A device may send a message to the device management service requesting that a resource perform a resource action. As an example, a message may include a request that a device shadowing service update a device representation (which is configured to represent a state of the device) to a state specified in the request. As in block 810, the request may be received from the device, and in response to receiving the message, the device may be identified. For example, the message may include identifying information (e.g., a device identifier, device address, etc.) that may be used to identify a device profile for the device.

After the identity of the device has been established, as in block 820, device credentials linked to the device may be identified. As described earlier, device credentials may be linked to a device via information included in a device credentials, such as a device identifier or a device attribute. The device credentials may be exclusive to the device, or the device credentials may be shared among a group of devices (e.g., the device credentials may be linked to multiple device identifiers or linked to one or more device attributes). In one example, the device credentials may be associated with a specific resource. For example, the device credentials may be used by a device shadowing service to authenticate devices requesting resource actions. In another example, the device credentials may be used to access multiple resources. For example, the device credentials may be used to authenticate devices requesting resource actions associated with any resource provided via a resource management service.

As in block 830, a device credentials identified as being associated with the device may be authenticated using an authentication method. In the case that authentication of the device credentials fails, then as in block 840, the device request may be denied and a message may be sent to the device specifying that the request is denied and a reason why the request has been denied (e.g., an error code). In the case that authentication of the device credentials is successful (e.g., the identity of the device is confirmed), and then as in block 850, a device policy linked to the device may be identified. The device policy may be used to control device access to the resource requested by the device.

In one example, a device policy may be linked to a device via a device profile. For example, the device policy may be linked to a device identifier or to device metadata included in the device policy. Thus, identifying a device policy in response to a device request may involve identifying a device policy that is associated with both information included in a device profile and a resource requested by the device.

In another example, a device policy may be linked to device credentials. For example, device credentials associated with a specific resource may be linked to a device policy used to grant access to the resource. Accordingly, in response to a request from a device to access the resource, device credentials and a device policy associated with the resource may be identified.

As in block 860, a parameter included in the device policy may be populated using a device attribute. For example, as described earlier, the device policy may comprise a policy document that includes device permissions for accessing a resource and one or more parameters that may be dynamically populated with a device attribute. For example, a device attribute, such as a device name, may be obtained from metadata included in a device profile, and the device attribute may be used to populate the parameter included in the device policy. Accordingly, device permissions controlled by a device policy may be dynamically determined by populating parameters in the device policy at the time that the device policy is applied to a device request.

After populating the parameter in the device policy with the device attribute, as in block 870, the device policy may be evaluated to determine whether conditions of the device policy have been satisfied. In the case that the conditions of the device policy have been satisfied, then as in block 880, the device request may be allowed. In the case that the conditions of the device policy have not been satisfied, then as in block 840, the device request may be denied.

Figure 9:
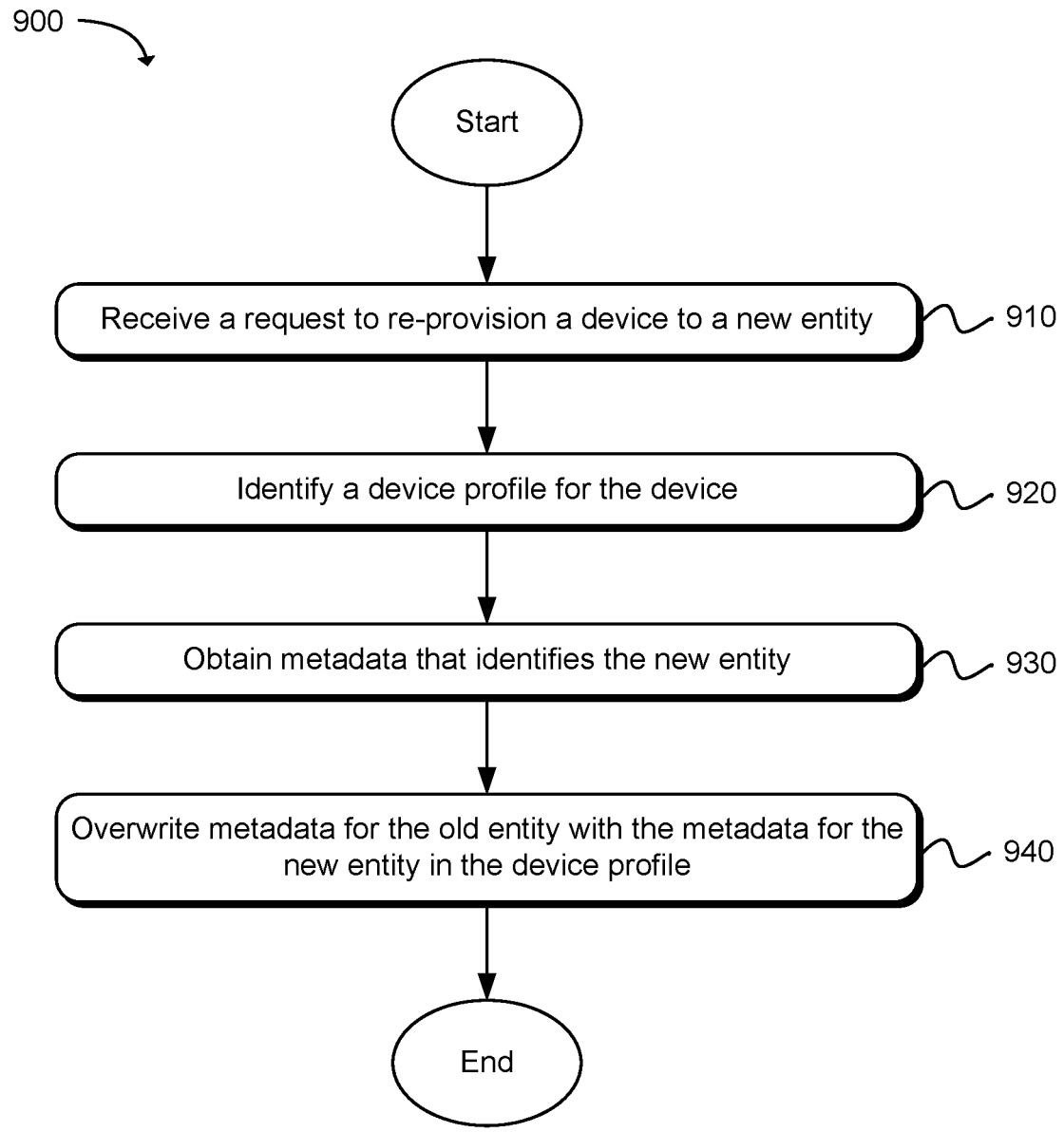
FIG. 9 is a flow diagram illustrating an example method for re-provisioning a device.

FIG. 9 is a flow diagram that illustrates an example method 900 for re-provisioning a device to a new entity. For example, a device may be re-provisioned to a new owner, geographic location, network, function, etc. As one example, a network addressable appliance included in a group of appliances may be physically moved from a first building to a second building, and in doing so, the appliance may be re-provisioned from the group of appliances in the first building to a group of appliances in the second building. As another example, a product ordering device configured to order a product via pushing a device button may be re-provisioned from ordering the product to ordering a different product.

In one example, pre-provisioning a device may comprise, as in block 910, receiving a request at a device management service (described earlier) to re-provision the device to a new entity. In receiving the request, as in block 920, a device profile for the device may be identified. The device profile may include metadata that associates the device with a particular entity. For example, the metadata may include a device group name, geographic location, product identifier, etc.

As in block 930, metadata that identifies the new entity may be obtained. For example, the metadata may be included in the request to re-provision the device. Thereafter, as in block 940, metadata in the device profile that identifies the old entity may be overwritten (updated) with the metadata that identifies the new entity. As an example, metadata that identifies a device group, geographic location, product, etc. may be updated to a new device group, geographic location, product, etc., thereby re-provisioning the device to the new entity.

Figure 10:
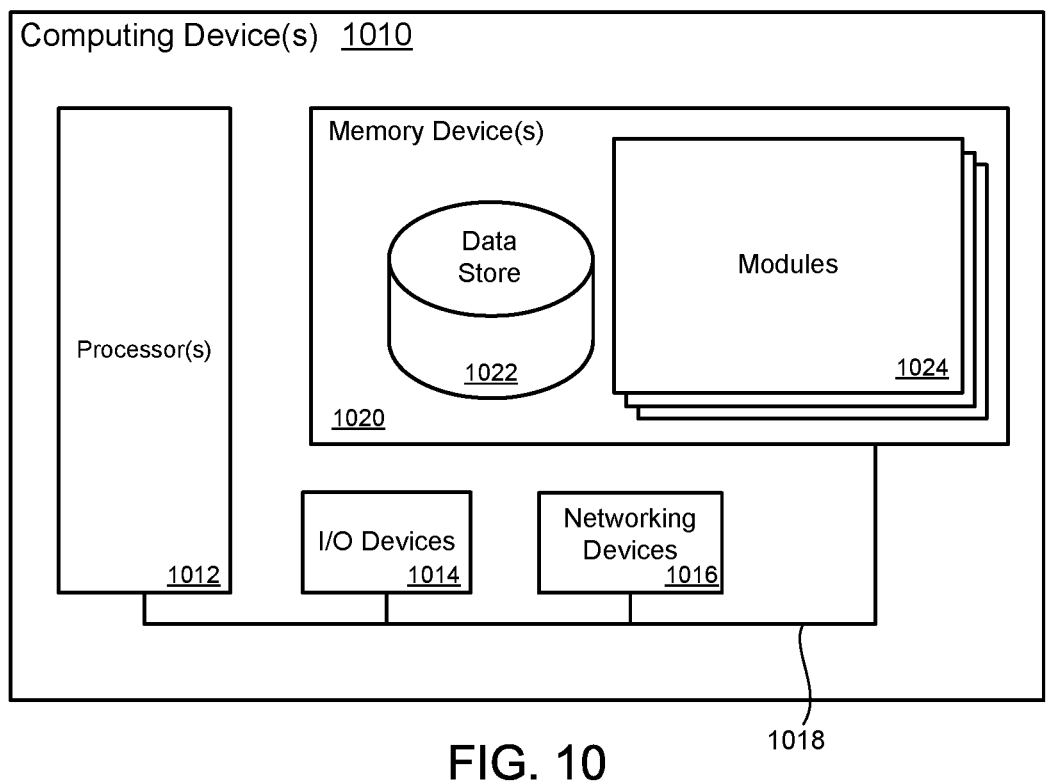
FIG. 10 is block diagram illustrating an example of a computing device that may be used to execute a method for resolving device credentials for devices.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device 1010 may include a local communication interface 1018 for the components in the computing device. For example, the local communication interface 1018 may be a local data bus and/or any related address or control busses as may be desired.

The memory device 1020 may contain modules 1024 that are executable by the processor(s) 1012 and data for the modules 1024. For example, the memory device 1020 may include an authentication and authorization module, a credentials association module, a device registry module, a security service module, and other modules. The modules 1024 may execute the services and functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor(s) 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory device 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for resolving credentials for a device, comprising:
at least one processor;
a credentials data store usable to store device credentials; and
a memory device including instructions that, when executed by the at least one processor, cause the system to:
receive, for management by a service provider:
device credentials that include authentication credentials shared by a plurality of devices that includes the device, the device credentials being associated with one or more device policy documents, the authentication credentials being usable to authenticate the device, the device being configured to communicate via a network with resources provided by the service provider; and
a device policy document that:
is linked to the device credentials via metadata in a device profile, the device credentials allowing the device policy document to be applied to the plurality of devices that share the device credentials; and
includes a parameter that is associated with a policy condition that, when satisfied, authorizes performance of a resource action requested by the device, the parameter being a setting that can be populated with an attribute from metadata of the device profile;
receive a request from the device requesting that a managed service provided by the service provider perform an action, the managed service is in network communication with the device;
authenticate the device using the authentication credentials;
obtain the device policy document linked to the device credentials from the credentials data store;

obtain, from the metadata, a device attribute usable for determining satisfaction of the policy condition for the device;

populate the parameter in the device policy document with the device attribute to produce an updated device policy document;

determine, by application of the updated device policy document to the request, that the parameter with the attribute satisfies the policy condition to allow the device to request performance of the action; and authorize the request to be sent to the managed service to perform computing services.

2. The system of claim 1, wherein the device policy document comprises permissions is to be applied to the device when authenticating the device, based at least in part on the device profile.

3. The system of claim 1, wherein the device policy document is disassociated with a device, based at least in part on unlinking the device policy document from the device credentials.

4. The system of claim 1, wherein:
instructions further cause the system to obtain a group attribute associated with a group of devices, the group attribute usable as the device attribute for the device; and the instructions that cause the system to populate the parameter include instructions that cause the system to populate the parameter with the group attribute.

5. The system of claim 1, wherein the device profile comprises a device identity that includes the metadata of the device.

6. A computer implemented method, comprising:
receiving, by a service provider:
device credentials that include authentication credentials shared by a plurality of devices that includes a device, the device credentials managed based at least in part on an association between the device credentials and a plurality of policy documents, the authentication credentials used to authenticate a device included in the plurality of devices, the plurality of devices configured to communicate via a network with resources provided by a service provider; and a device policy document that:
is linked to the device credentials via device metadata included in a device profile, the device credentials allowing the device policy document to be applied to the plurality of devices that share the device credentials; and includes a parameter that is associated with a policy condition that, when satisfied, authorizes performance of a resource action requested by the device, the parameter being a setting that can be populated with an attribute from metadata of the device profile;

receiving a request that a resource perform the resource action associated with the device;

authenticating the device using the authentication credentials for the device;

obtaining the device policy document linked to the device credentials used to authorize performance of the resource action;

obtaining, from the device metadata, a device attribute usable for determining satisfaction of the policy condition for the device;

populating the parameter in the device policy document with the device attribute; and authorizing the resource action when the policy condition in the device policy document is satisfied, the policy condition is satisfied based at least in part on using the parameter.

7. The method of claim 6, wherein the device policy document includes static parameters specifying the resource and the resource action.

8. The method of claim 6, further comprising:
obtaining device metadata for the device; and
populating the parameter in the device policy document with the device metadata.

9. The method of claim 6, further comprising:
obtaining a group attribute for a group of devices; and
populating the parameter in the device policy document with the group attribute.

10. The method of claim 6, further comprising:
identifying a resource associated with the resource action requested by the device; and
identifying the device policy document associated with the resource.

11. The method of claim 6, further comprising providing the device credentials to a managed service configured to perform the resource action requested by the device.

12. The method of claim 6, wherein the request is received from the device or from an application used to remotely control the device.

13. The method of claim 6, further comprising updating a device profile for a device to disassociate the device from a first device policy document and associate the device with a second device policy document.

14. The method of claim 6, further comprising managing the association using computing resources included in a computing service provider environment or in a customer data center located on customer premises.

15. The computer implemented method of claim 6, wherein populating the parameter in the device policy document includes populating the parameter with a group attribute associated with a group of devices, the device being a member of the group of devices.

16. A non-transitory machine-readable storage medium having instructions embodied thereon, the instructions when executed by a processor:
receive, for management by a managed service:
device credentials shared by a plurality of devices configured to request a resource to perform a resource action, the device credentials include authentication credentials, and the device credentials are used to authenticate an identity of a device included in the plurality of devices; and a device policy document that:
is linked to the device credentials to allow the device policy document to be applied to the plurality of devices that share the device credentials; and includes a parameter that is associated with a policy condition that, when satisfied, authorizes performance of the resource action requested by the device, the parameter being a setting that can be populated with an attribute from metadata of a device profile;

receive a request, from a hub device, requesting performance of the resource action, wherein the request includes the authentication credentials, wherein the hub device sends requests to the managed service on behalf of devices associated with the hub device;

authenticate the device using the authentication credentials;

retrieve the device policy document linked to the device credentials which includes the parameter;

obtain, from metadata, a device attribute usable for determining satisfaction of the policy condition for the device;

populate the parameter in the device policy document with the device attribute to produce an updated device policy document;

determine, by application of the updated device policy document to the request, that the parameter with the attribute satisfies the policy condition of the device policy document; and authorize the resource action requested in the request.

17. The non-transitory machine-readable storage medium of claim 16, wherein the device policy document specifies permissions that allow requests associated with the device to be sent to a managed service configured to perform the resource action requested by the device.

18. The non-transitory machine-readable storage medium of claim 16, wherein the parameter in the device policy document is populated with a group attribute for a group of devices.

19. The non-transitory machine-readable storage medium of claim 16, wherein the device credentials are owned by the resource and the device credentials are used to authenticate identities of the devices configured to request that the resource perform a resource action.

20. The non-transitory machine-readable storage medium of claim 16, wherein the hub device is authenticated using device credentials assigned to the hub device.

* * * * *